(12) United States Patent
Khilnani et al.

(10) Patent No.: US 8,104,088 B2
(45) Date of Patent: Jan. 24, 2012

(54) TRUSTED OPERATING ENVIRONMENT FOR MALWARE DETECTION

(75) Inventors: Reshma Khilnani, Beijing (CN); Kristofer N. Iverson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1047 days.

(21) Appl. No.: 11/747,345

(22) Filed: May 11, 2007

(65) Prior Publication Data

US 2008/0282350 A1    Nov. 13, 2008

(51) Int. Cl.
*H04L 9/32* (2006.01)
*G06F 11/00* (2006.01)
*G06F 11/30* (2006.01)

(52) U.S. Cl. ............... 726/24; 726/25; 726/26; 726/27; 726/28; 726/29; 713/188; 713/189

(58) Field of Classification Search .................. 726/24
See application file for complete search history.

(56) References Cited

U.S. PATENT DOCUMENTS

| | | |
|---|---|---|
| 6,269,456 B1 | 7/2001 | Hodges et al. |
| 6,973,577 B1 | 12/2005 | Kouznetsov |
| 7,043,757 B2 | 5/2006 | Hoefelmeyer et al. |
| 7,184,554 B2 * | 2/2007 | Freese .......................... 380/270 |
| 7,188,369 B2 | 3/2007 | Ho et al. |
| 7,243,373 B2 | 7/2007 | Muttik et al. |
| 7,853,999 B2 | 12/2010 | Khilnani et al. |
| 2004/0254978 A1 | 12/2004 | Ibanez et al. |
| 2005/0015606 A1 | 1/2005 | Blamires et al. |
| 2005/0091558 A1 | 4/2005 | Chess et al. |
| 2005/0176415 A1 | 8/2005 | Jang et al. |
| 2005/0193188 A1 | 9/2005 | Huang |
| 2006/0031673 A1 | 2/2006 | Beck et al. |
| 2006/0130141 A1 | 6/2006 | Kramer et al. |
| 2006/0253908 A1 | 11/2006 | Yang |
| 2007/0094654 A1 | 4/2007 | Costea |
| 2007/0289015 A1 | 12/2007 | Repasi et al. |
| 2008/0016313 A1 * | 1/2008 | Murotake et al. ............. 711/173 |

(Continued)

FOREIGN PATENT DOCUMENTS

CN    1655088    8/2005

(Continued)

OTHER PUBLICATIONS

Marx—"Rescue ME 2: Disinfection with Bootable rescue media", Mar. 2004.*

(Continued)

*Primary Examiner* — Longbit Chai
(74) *Attorney, Agent, or Firm* — Lee & Hayes, PLLC

(57) ABSTRACT

Techniques and apparatuses for scanning a computing device for malware are described. In one implementation, a trusted operating environment, which includes a trusted operating system and a trusted antivirus tool, is embodied on a removable data storage medium. A computing device is then booted from the removable data storage medium using the trusted operating system. The trusted antivirus tool searches the computing device for malware definition updates (e.g., virus signature updates) and uses the trusted operating system to scan the computing device for malware. In another implementation, a computing device is booting from a trusted operating system on a removable device and a trusted antivirus tool on the removable device scans the computing device for malware. The removable device can update its own internal components (e.g., virus signatures and antivirus tool) by searching the computing device or a remote resource for updates and authenticating any updates that are located.

19 Claims, 6 Drawing Sheets

U.S. PATENT DOCUMENTS

| | | |
|---|---|---|
| 2008/0052507 A1 | 2/2008 | Chow et al. |
| 2009/0217258 A1 | 8/2009 | Wenzinger et al. |
| 2009/0319782 A1 | 12/2009 | Lee |
| 2010/0122343 A1 | 5/2010 | Ghosh et al. |
| 2010/0332593 A1 | 12/2010 | Barash et al. |

FOREIGN PATENT DOCUMENTS

| | | |
|---|---|---|
| KR | 1020070016029 | 7/2007 |
| WO | WO2006049475 A1 | 5/2006 |

OTHER PUBLICATIONS

Chinese Office Action mailed Aug. 25, 2011 for Chinese patent application No. 200880015243.5, a counterpart foreign application of U.S. Appl. No. 11/747,345 11 pages.

Chinese Office Action mailed Sep. 23, 2011 for Chinese patent application No. 200880015323.0, a counterpart foreign application of US patent No. 7,853,999, 8 pages.

Ilascu, "The Insides of Panda Cloud Antivirus", May 16, 2009, interview retrieved Jan. 3, 2011 from <<http://news.softpedia.com/news/The-Insides-of-Panda-Cloud-Antivirus-111793.shtml>>, 4 pages.

Chinese Office Action mailed Apr. 20, 2011 for Chinese patent application No. 200880015323.0, a counterpart foreign application of US patent No. 7,853,999, 16 pages.

Dai, et al., "MAPMon: A Host-Based Malware Detection Tool", IEEE International Symposium on 13th Pacific Rim Dependable Computing, Dec. 17, 2007, pp. 349-356.

Wang et al., "Fast User-Mode Rootkit Scanner for the Enterprise", retrieved at <<http://portal.acm.org/citation.cfm?id=1251153&coll=Portal&dl=GUIDE&CFID=26574536&CFTOKEN=52527883>>, LISA Conference, Dec. 2005, pp. 23-30.

Office Action for U.S. Appl. No. 12/964,889, mailed on Nov. 15, 2011, Reshma P. Khilnani, "Trusted Operating Environment for Malware Detection", 10 pgs.

\* cited by examiner

TRUSTED OPERATING ENVIRONMENT FOR MALWARE DETECTION

RELATED APPLICATION

This application is related to U.S. application Ser. No. 11/747,416, filed May 11, 2007, entitled "Trusted Operating Environment for Malware Detection", which is incorporated by reference herein.

BACKGROUND

Computer security is a serious concern in today's technology-driven culture. A breach of a computer's security can occur when the computer is infected with viruses and other forms of malicious software (malware). Such infections can occur, for example, when files (e.g., email) infected with malware are downloaded and opened, or infections may occur when malware accesses a computer over a network without any direct user intervention. In any case, the prevalence of these security threats has resulted in a wide variety of security-related tools that are available for computers. Examples of these tools include antivirus programs, adware scanners, firewalls, and the like. Despite the availability of these tools, computers continue to be infected with malware.

One reason for the persistence of malware infection is the ability of some malware to hide from security tools. Malware can hide from many security tools through the use of a rootkit, which generally stated, is a set of software tools intended to conceal running processes, files or system data from a computer's operating system. Rootkits can hook themselves very low in a computer's system (e.g., at the kernel level) and intercept the principal system services that the computer's operating system and other applications utilize while running on the computer. In one example, an antivirus tool that resides on a computer scans the computer's hard disk for viruses. As part of the scan process, the computer's operating system makes one or more function calls, such as an "open file" call for a certain file. However, malware that is resident on the computer may use a rootkit to intercept the "open file" function call and return a "file missing" error or return the wrong file. Thus, the antivirus tool is unable to access the requested file and check it for virus infection. If the requested file is infected with a virus, the infection will persist undetected.

SUMMARY

Techniques and apparatuses for scanning a computing device for malware are described. In one implementation, a trusted operating environment, which includes a trusted operating system and a trusted antivirus tool, is embodied on a removable data storage medium. A computing device is then booted from the removable data storage medium using the trusted operating system. The trusted antivirus tool searches the computing device for malware definition updates (e.g., virus signature updates) and interacts with the trusted operating system to scan the computing device for malware. Another implementation uses a removable device, such as a universal serial bus (USB) drive with a microcontroller, to store the trusted operating environment. A computing device is booted using the trusted operating system and the trusted antivirus tool scans the computing device for malware. The removable device can update its own internal components (e.g., virus signatures and antivirus tool) by searching the computing device or a remote resource for updates and authenticating any updates that are located.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The devices and techniques described herein provide a trusted operating environment through which a computing device may be scanned for viruses and other forms of malicious software (malware), and disinfected of any such entities. The terms "virus" and "malware" are used interchangeably herein, and both refer generally to collections of computer code that are designed to infiltrate and/or damage a computer system without the owner's informed consent. Other examples of malware include trojan horses, worms, spyware and the like. The trusted operating environment is created by a trusted authority, such as a software or hardware manufacturer, and is then embodied on a device or a computer-readable medium that can be interfaced with a computing device. Unauthorized access to the trusted operating environment is prevented through the use of read-only media, authentication protocols, and microcontrollers that permit only trusted data to have access to the trusted operating environment. As used herein, the term authentication refers to any suitable method or protocol that may be implemented to verify the identity of an entity from which a communication or data file originates and to ensure that the communication or data file has not been tampered with or impermissibly altered by an unauthorized entity.

In one example, the trusted operating environment includes a trusted operating system and a trusted antivirus tool. A computing device can be booted using the trusted operating system and thus circumvent the problem of rootkits and other malware that may be hiding on the computing device. The trusted antivirus tool can then scan the computing device and be assured that its interaction with the trusted operating system will accurately reflect the state of the computing device.

Exemplary Architecture

Figure 1:
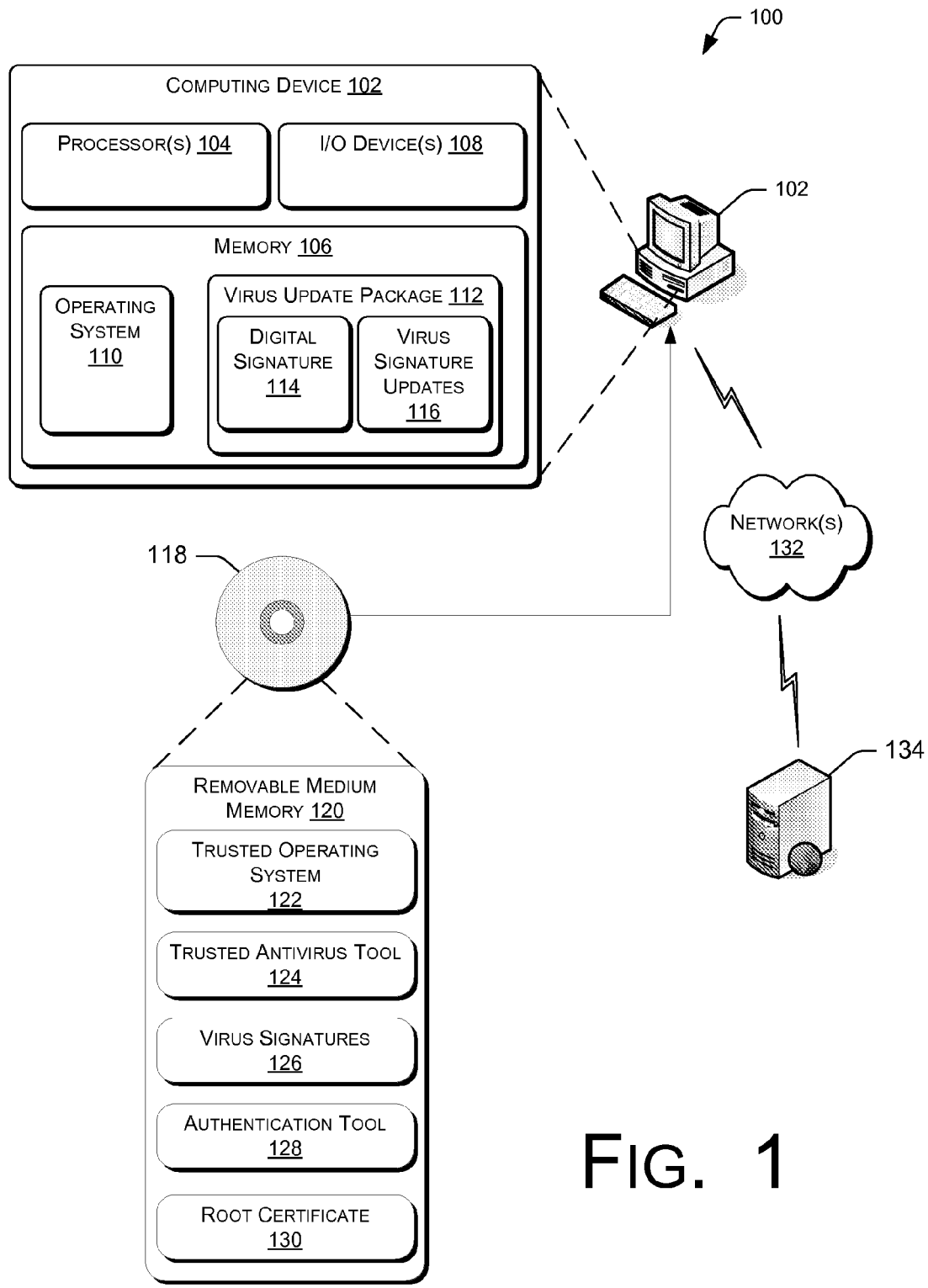
FIG. 1 illustrates an exemplary architecture and removable data storage medium for implementing techniques to scan a computing device for malware.

FIG. 1 shows an architecture 100 that can implement the described processes and techniques. As part of architecture 100 is computing device 102. Although illustrated as a desktop PC, computing device 102 may be implemented as any of a variety of conventional computing devices including, for example, a server, a notebook or portable computer, a workstation, a mainframe computer, a mobile communication device, a PDA, an entertainment device, a set-top box, an Internet appliance, a game console, and so forth.

Computing device 102 can include, but is not limited to, one or more processors 104, a memory 106, Input/Output (I/O) devices 108 (e.g., keyboard and mouse), and a system bus (not illustrated) that operatively couples various components including processor(s) 104 to the memory 106. The memory of computing device 102 includes computer-readable media in the form of volatile memory, such as Random Access Memory (RAM) and/or non-volatile memory, such as Read Only Memory (ROM) or flash RAM. Memory 106 typically includes data and/or program modules, such as operating system 110 and virus update package 112. As part of virus update package 112 are digital signature 114 and virus signature updates 116, which will be discussed in more detail below.

To implement a virus scanning process, a user loads removable data storage medium 118 into computing device 102 such that the computing device can read the removable medium. Removable data storage medium 118 is a data storage medium that can be interfaced with a computing device (e.g., by inserting it in a disk drive) and removed without having to disassemble the computing device. Although removable data storage medium 118 is illustrated here as a compact disk (CD) or a digital versatile disk (DVD), any suitable computer-readable removable data storage media may be employed, including other optical storage media, flash memory, magnetic cassettes, magnetic tape, magnetic disk storage or other magnetic storage devices, or any other removable storage medium which can be used to store data and which can be accessed by a computer. Further, removable data storage medium 118 may be a read-only medium such that the data and files contained thereon cannot be contaminated by malware from an infected source (e.g., computing device 102) that attempts to infect the storage medium.

The user then boots computing device 102 from removable data storage medium 118. Removable data storage medium 118 includes removable medium memory 120, which stores data and/or program modules and components for implementing the described processes. The terms "module" or "component" as used herein generally represent software, firmware, or a combination of software and firmware. As part of the boot process, computing device 102 loads trusted operating system (OS) 122 from removable medium memory 120. Trusted antivirus tool 124 is then launched from removable medium memory 120, either automatically or by express action by the user.

Trusted antivirus tool 124 then loads virus signatures 126 that are stored on removable medium memory 120. Virus signatures 126 are a set of virus "fingerprints" that are used to identify viruses. An exemplary virus signature is a binary pattern of all or part of a virus's computer code. Trusted antivirus tool 124 also searches computing device 102 and identifies any virus signatures that are not currently stored on removable medium memory 120. In one example, trusted antivirus tool 124 locates virus update package 112, which contains virus signature updates 116, on memory 106. Virus signature updates 116 include one or more virus signatures, some of which may be different (e.g., they may identify more recently catalogued viruses) than any stored on removable data storage medium 118. Before utilizing virus signature updates 116 in a virus scan, trusted antivirus tool 124 verifies the authenticity of virus update package 112 using authentication tool 128.

To verify and/or authenticate virus update package 112, authentication tool 128 utilizes root certificate 130 from removable medium memory 120 to authenticate digital signature 114. Generally stated, digital signature 114 is a coded message or other piece of data that is compared with root certificate 130 to determine if virus update package 112 originates from a trusted authority and has not been tampered with. In one example, digital signature 114 is part of a digital certificate, such as an X.509 certificate, that is part of virus update package 112. If digital signature 114 is determined to be authentic, trusted antivirus tool 124 designates the virus signature updates as authenticated and loads the virus signature updates. This authentication method is presented for purposes of example only, and any suitable cryptographic, verification and/or authentication protocol may be utilized to verify that the virus signature updates have originated from a trusted authority.

Trusted antivirus tool 124 then runs on computing device 102 and scans computing device 102 for viruses using virus signatures 126 and any authenticated virus signature updates from virus update package 112. By interacting with trusted operating system 122 in the virus scan, a user can be assured that operating system calls made during the virus scan process will correctly return the requested files and give an accurate description of computing device 102.

Further to architecture 100, computing device 102 may use network(s) 132 to access remote resource 134. Network(s) 132 may include, but is not limited to, a Local Area Network (LAN), a Wide Area Network (WAN), and a Metropolitan Area Network (MAN). Remote resource 134 may be a web server, a server farm, a mainframe computer, a data center, or any other resource capable of storing and/or transmitting data. Thus, trusted antivirus tool 124 can utilize computing device 102 and network(s) 132 to access remote resource 134 and identify and download one or more virus signature updates that reside on the remote resource. Any virus signature updates that are identified on remote resource 134 would be authenticated, as discussed above.

Figure 2:
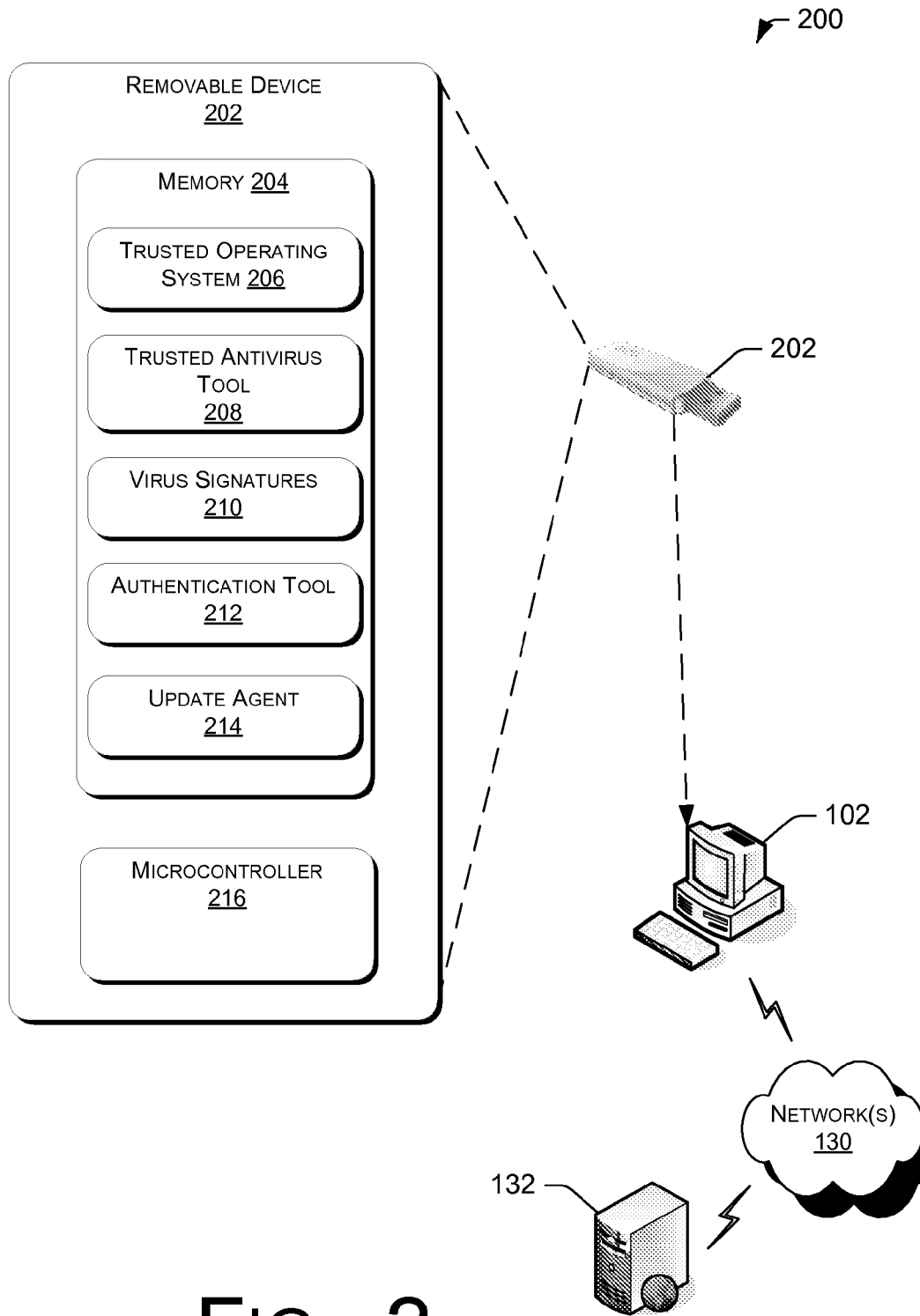
FIG. 2 illustrates an exemplary architecture and removable device for implementing techniques to scan a computing device for malware.

FIG. 2 shows an exemplary architecture 200 that can implement the described processes and techniques and variations thereof. Architecture 200 includes computing device 102, introduced in FIG. 1. Also shown is removable device 202. Although removable device 202 is shown here as a universal serial bus (USB) device, any suitable removable and/or portable device may be utilized, such as a PC card, smartcard, Firewire device, and the like. In operation, removable device 202 is interfaced with computing device 102 and the computing device is booted from the removable device. As part of the boot process, computing device 102 accesses memory 204 on removable device 202 and loads trusted operating system 206. Memory 204 typically includes data, program modules and components for implementing the described processes that are immediately accessible to and/or presently operated on by microcontroller 216 and/or computing device 102.

Trusted antivirus tool 208 is then launched from memory 204 and the trusted antivirus tool loads virus signatures 210 from memory 204. Trusted antivirus tool 208 can optionally locate and authenticate virus signature updates on computing device 102 using processes similar to those discussed above with respect to FIG. 1. Trusted antivirus tool 208 then proceeds to scan computing device 102 for viruses using the loaded virus signatures. By interacting with trusted operating system 206 that is running on computing device 102, trusted antivirus tool 208 can perform a thorough virus scan of computing device 102, including any storage devices (e.g., hard drives), the basic input/output system (BIOS), hardware, firmware, and the like. If any viruses are located, the viruses are removed from computing device 102. Computing device 102 can then be rebooted into a clean operating environment using its own internal operating system.

Removable device 202 has the ability to securely update its own internal components using update agent 214 and microcontroller 216. Microcontroller 216 is an integrated circuit or microprocessor that includes components necessary to control certain procedures and actions of removable device 202. Though not illustrated in FIG. 2, components of microcontroller 216 include one or more processors, one or more forms of memory (e.g., read-only memory and/or random access memory), input/output ports, timers, and the like.

Any components of removable device 202 may be updated, including virus signatures 210 and trusted antivirus tool 208. As part of the update process, microcontroller 216 can utilize update agent 214 to search computing device 102 for one or more removable device component updates. Microcontroller 216 can also utilize update agent 214 to access remote resource 134 via computing device 102 and network(s) 132 to obtain the desired component updates. If any component updates are located, authentication tool 212 can use any suitable authentication and/or cryptographic protocol to verify that the component updates originate from a trusted authority. If a component update is determined to be authentic (i.e., it passes the authentication process) by authentication tool 212, the component update is written to memory 204. Otherwise, microcontroller 216 prevents any unauthenticated and unauthorized data (e.g., component updates that have not passed the authentication process) from being written onto memory 216. Leveraging microcontroller 216 as a "gatekeeper" permits removable device 202 to be dynamically updated while maintaining the trusted aspect of its internal components.

Exemplary Processes

Figure 3:
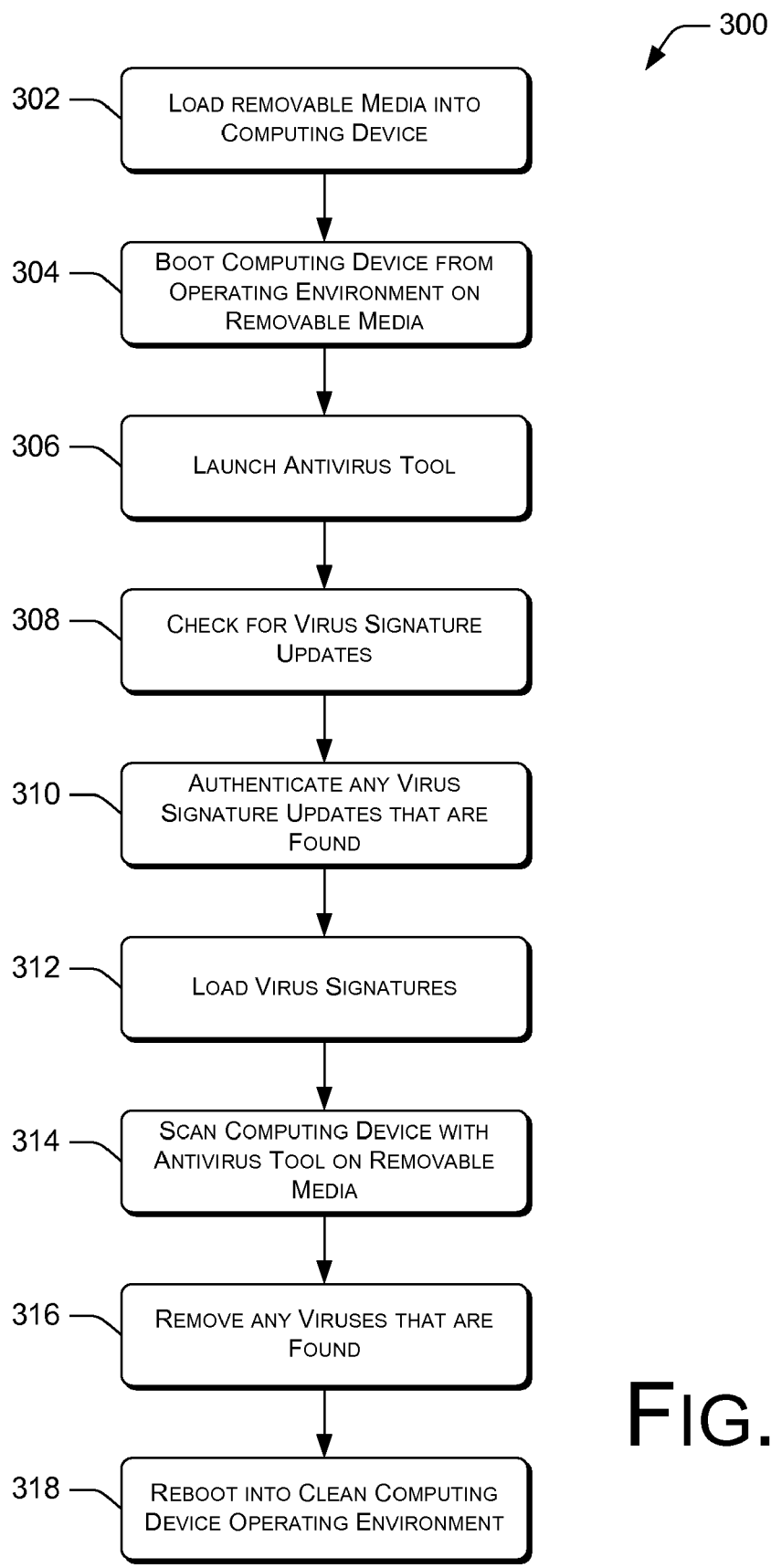
FIG. 3 is a flow diagram of an exemplary process for searching for malware updates and scanning a computing device for malware.

FIG. 3 illustrates an exemplary process 300 for performing a virus scan. The process 300 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. While the processes below are discussed in terms of separate acts, this is not intended to be limiting, and the discussed acts may be combined in some examples. For discussion purposes, the process 300 is described with reference to architecture 100 shown in FIG. 1.

At 302, a removable data storage medium (such as removable data storage medium 118) is loaded into a computing device. At 304, the computing device is booted from a trusted operating environment on the removable data storage medium. As part of this boot process, a trusted operating system is loaded from the removable data storage medium onto the computing device. At 306, a trusted antivirus tool is launched from the removable data storage medium. Act 306 may be accomplished by running the trusted antivirus tool from the removable data storage medium, or loading the trusted antivirus tool onto the computing device and running the tool from computing device. At 308, the trusted antivirus tool searches the computing device and locates any virus signature updates. The virus signature updates may be part of a virus update package that includes the virus signature updates and a digital signature that can be used to authenticate the updates. The digital signature may be part of an authentication certificate, such as an X.509 certificate, that is stored as part of the virus update package or elsewhere on the computing device. The trusted antivirus tool may also utilize the computing device and a network to search a remote resource for virus signature updates. If any virus signature updates are located and/or identified, the updates are authenticated at 310. In one example, act 310 includes processing the digital signature to determine if the virus signature updates originate from a trusted authority.

At 312, the trusted antivirus tool loads any virus signatures that are stored on the removable data storage medium, along with any authenticated virus signature updates. At 314, the trusted antivirus tool interacts with the trusted operating system loaded on the computing device to scan the computing device for any viruses that match the loaded virus signatures. The trusted antivirus tool can perform a comprehensive scan of the computing device, including any storage devices (e.g., the hard drive), the BIOS, hardware, firmware, and the like. At 316, any viruses that are located are removed from the computing device. At 318, the computing device is rebooted into a clean internal operating environment. The internal operating environment includes an operating system that has been scanned and cleaned of any viruses or other malware using the techniques discussed herein.

Figure 4:
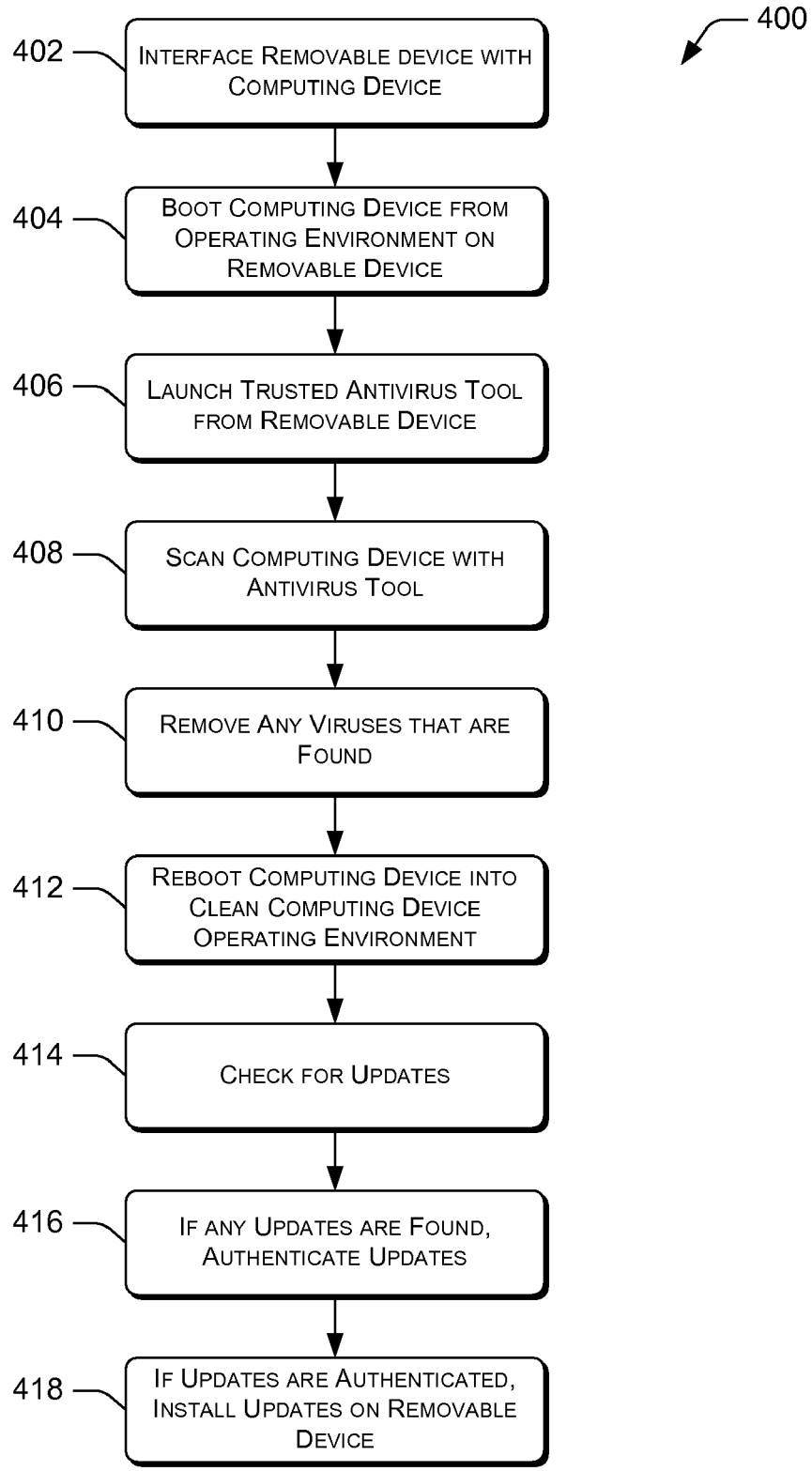
FIG. 4 is a flow diagram of an exemplary process for scanning a computing device for malware and updating components of a removable device.

FIG. 4 illustrates an exemplary process 400 for performing a virus scan. The process 400 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 400 is described with reference to architecture 200 shown in FIG. 2.

At 402, a removable device (e.g., removable device 202) is interfaced with a computing device that a user wishes to scan for viruses. In one example, act 402 is accomplished by plugging the removable device into the appropriate port (e.g., a USB port) on the computing device. At 404, the computing device is booted from the removable device. As part of the boot process, a trusted operating system is loaded from the removable device onto the computing device. At 406, a trusted antivirus tool is launched from the removable device. Act 406 may be accomplished by running the trusted antivirus tool from the removable device, or loading the trusted antivirus tool onto the computing device and running the tool from computing device. As part of act 406, the trusted antivirus tool loads one or more virus signatures that are stored on the removable device. The removable device may also locate one or more virus signature updates that are stored on the computing device and/or a remote resource, authenticate the virus signature updates, and load any authenticated virus signature updates. At 408, the trusted antivirus tool interacts with the trusted operating system loaded on the computing device to scan the computing device for any viruses. The antivirus tool identifies any viruses based on the virus signatures stored on the removable device, plus any authenticated virus signature updates from the computing device. Any viruses that are located are removed at 410.

At 412, the computing device is rebooted into a clean internal environment that includes an operating system that has been scanned and cleaned of viruses. The internal operating system is an operating system that resides on the computing device (i.e., it is not the operating system that was loaded from the removable device). At 414, the removable device then checks for updates to its internal components (e.g., virus signatures and the antivirus tool itself). The removable device may search the computing device for component updates, or may optionally access a remote resource to search for component updates. If any component updates are located, the component updates are authenticated at 416 using any suitable authentication and/or cryptographic process. If any component updates pass the authentication process, the component updates are installed on the removable device at 418. Although not shown here, the process may optionally return to act 404 and rescan the computing device for viruses using any virus signature updates (or other component updates) that were installed on the removable device at 418.

Thus, as illustrated, process 400 allows a virus scan to be performed on a computing device using a trusted operating system loaded from a removable device. Once the computing device has been scanned and disinfected of any viruses, the removable device can then search for any updates to its own internal components, authenticate any updates that are located, and load the authenticated updates. In some implementations, this process is achieved by operating the removable device in a read-only mode during most regular file system operations (e.g., during a virus scan), thus preventing viruses and other malware from infecting the removable device. During update operations, component update packages are transferred to the removable device and authenticated. A microcontroller on the removable device controls the authentication process and checks the component update packages for signatures and/or certificates. If the microcontroller determines that the signature and/or certificate for a particular update package is valid, the microcontroller will allow the update package to be written to the removable device. Otherwise, the removable device will remain in a read-only state to maintain the integrity of its trusted operating environment.

Figure 5:
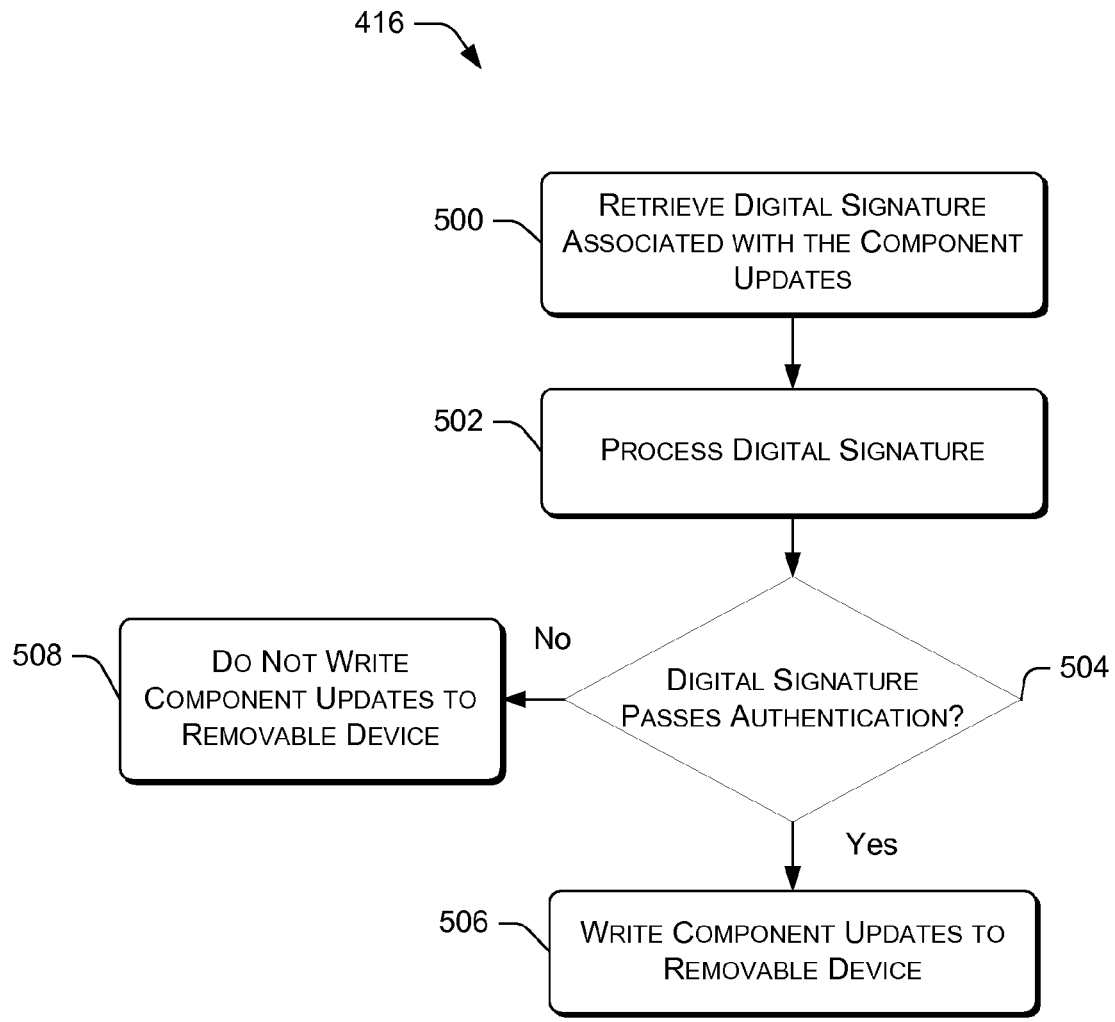
FIG. 5 is a flow diagram of an exemplary process for authenticating removable device component updates.

FIG. 5 illustrates one example of a process for authenticating removable device component updates, as illustrated above in act 416 of FIG. 4. At 500, a digital signature that is associated with any removable device component updates is located and retrieved. As discussed above, this digital signature may be part of an overall authentication certificate. At 502, the digital signature is processed according to any suitable authentication and/or cryptographic protocol. In one example, the digital signature is verified with a root certificate that is stored on the removable device. At 504, it is determined if the digital signature has passed the authentication process. If the digital signature is determined to originate from a trusted authority (i.e., is designated as authentic), then the removable device component updates associated with the digital signature are written to the removable device at 506. If the digital signature fails the authentication process, then at 508, the removable device component updates are not written to the removable device. In one example, act 508 may include deleting from the computing device any removable device component updates that have failed the authentication process.

Secure Storage

Figure 6:
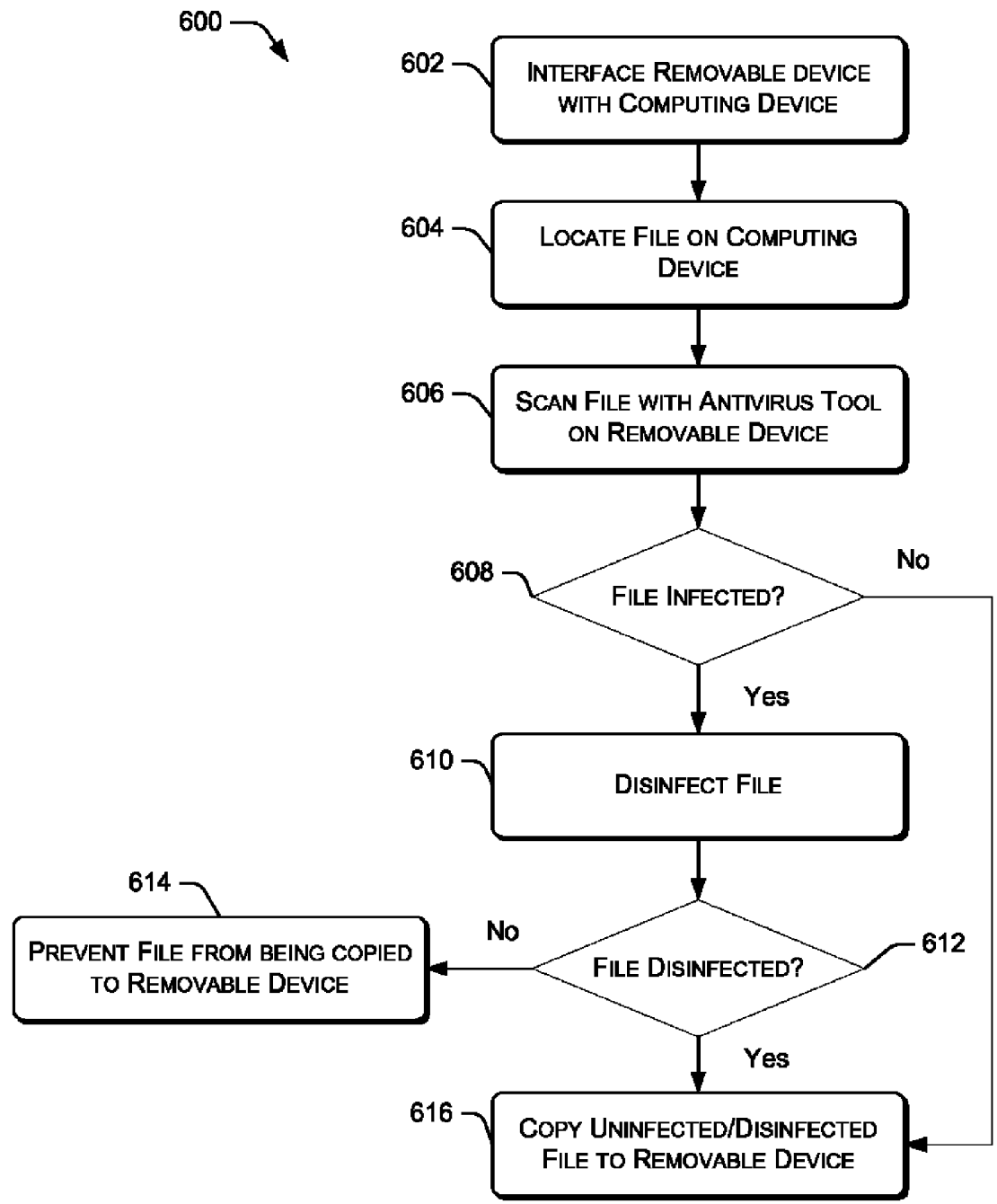
FIG. 6 is a flow diagram of an exemplary process for secure file storage.

FIG. 6 illustrates and exemplary process 600 for implementing a secure storage device. The process 600 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 600 is described with reference to removable device 202, as shown in FIG. 2.

At 602, a removable device is interfaced with a computing device. In one example, act 602 is accomplished by plugging the removable device into the appropriate port (e.g., a USB port) on the computing device. At 604, at least one data file that a user wishes to copy and/or transfer to the removable device is located on the computing device. In one example, multiple files may be located, and thus the illustrated process would be performed for each file. The data file may be stored locally on the computing device or may be located on a remote resource that is accessible to the computing device. At 606, the data file is scanned for viruses with an antivirus tool that resides on the removable device. At 608, it is determined if the data file is infected with a virus or other malware. If any viruses/malware are detected in the data file, the data files are disinfected of the viruses using the antivirus tool at 610 (i.e., the viruses are removed from the files). If no viruses or other malware are detected in the file, the file is copied to the removable device at 616. At 612, it is determined if the infected file was successfully disinfected. If the file was not successfully disinfected, at 614 the file is prevented from being copied to the removable device. Optionally, the file may be rescanned with the antivirus tool in a further attempt to disinfect the file. If the file was successfully disinfected, then at 616, the disinfected data file is copied to the removable device. The removable device may then transfer the copied file to other devices without fear of spreading any viruses that may have infected to file. This is particularly useful in public terminal scenarios (e.g., libraries) where many different users have access to a particular device. In such situations, users may unwittingly access and download contaminated files onto the public terminal. Using the secure storage process, a user can ensure that any files downloaded from such a terminal are free from virus contamination.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    loading a trusted operating system from an external storage medium onto a computing device;
    booting, by the trusted operating system, the computing device, the external storage medium comprising the trusted operating system and an antivirus tool;
    searching, with the antivirus tool, for virus signature updates;
    authenticating, with the antivirus tool, the virus signature updates in response to any virus signature updates being found; and
    scanning the computing device for viruses with the antivirus tool using virus signatures from the external storage medium and any authenticated virus signature updates from the computing device.

2. A method as recited in claim 1, wherein the searching for virus signature updates comprises searching for virus signature updates on a resource that is remote to the computing device.

3. A method as recited in claim 1, wherein the searching for virus signature updates comprises searching for virus signature updates on the computing device.

4. A method as recited in claim 1, wherein the scanning the computing device with the antivirus tool comprises loading one or more virus signatures from the external storage medium.

5. A method as recited in claim 1, wherein the computing device comprises:
one or more virus signature updates; and
a digital signature associated with the virus signature updates.

6. A method as recited in claim 5, wherein the authenticating comprises:
using an authentication tool on the external storage medium and a root certificate to process the digital signature; and
designating the virus signature updates as authenticated if the authentication tool determines that the digital signature originates from a trusted authority.

7. A method as recited in claim 1, further comprising:
removing the viruses if the scanning detects any viruses on the computing device; and
rebooting the computing device using an operating system internal to the computing device.

8. A method comprising:
loading, by a removable data storage medium, a trusted operating system onto a computing device from the removable data storage medium;
launching an antivirus tool from the removable data storage medium;
locating and authenticating, with the antivirus tool, any virus signature updates, the locating including locating any virus signature updates residing on the computing device; and
scanning, with the antivirus tool, the computing device for viruses using virus signatures from the removable data storage medium and any authenticated virus signature updates from the computing device.

9. A method as recited in claim 8, wherein the loading is performed as part of a boot process for the computing device.

10. A method as recited in claim 8, wherein the locating identifies one of more virus signature updates on a resource remote from the computing device.

11. A method as recited in claim 8, wherein the locating comprises locating a virus update package, the virus update package including one or more virus signature updates and a digital signature.

12. A method as recited in claim 11, wherein the authenticating comprises processing the digital signature to determine if the virus signature updates originate from a trusted authority.

13. A method as recited in claim 8, further comprising:
removing the viruses if the scanning detects one or more viruses on the computing device; and
rebooting the computing device using an operating system that is internal to the computing device.

14. A removable data storage medium comprising:
an operating system component to boot a computing device from the removable data storage medium, the booting including loading a trusted operating system onto the computing device; and
an antivirus tool component to identify and authenticate one or more virus signature updates and scan the computing device for viruses using virus signatures from the removable data storage medium and any authenticated virus signature updates from the computing device.

15. A removable data storage medium as recited in claim 14, wherein the antivirus tool component is configured to identify virus signature updates that are stored on the computing device.

16. A removable computer data storage medium as recited in claim 14, wherein the antivirus tool component is configured to identify virus signature updates that are stored on a resource remote to the computing device.

17. A removable data storage medium as recited in claim 14, wherein the authenticating comprises:
retrieving a digital signature associated with the virus signature updates; and
processing the digital signature with an authentication tool component to determine if the virus signatures originate from a trusted authority.

18. A removable computer data storage medium as recited in claim 14, further comprising one or more virus signatures for use by the antivirus tool.

19. A removable data storage medium as recited in claim 14, further comprising a root certificate for use by the antivirus tool component in authenticating the virus signature updates.

* * * * *

UNITED STATES PATENT AND TRADEMARK OFFICE
CERTIFICATE OF CORRECTION

PATENT NO. : 8,104,088 B2  
APPLICATION NO. : 11/747345  
DATED : January 24, 2012  
INVENTOR(S) : Reshma Khilnani et al.

Page 1 of 1

It is certified that error appears in the above-identified patent and that said Letters Patent is hereby corrected as shown below:

In column 10, line 23, in Claim 16, after "removable" delete "computer".

In column 10, line 35, in Claim 18, after "removable" delete "computer".

Signed and Sealed this
Sixth Day of March, 2012

David J. Kappos
*Director of the United States Patent and Trademark Office*